(12) United States Patent
Rowe et al.

(10) Patent No.: US 8,630,656 B2
(45) Date of Patent: Jan. 14, 2014

(54) METHOD AND SYSTEM FOR LOCATING A MOBILE RADIO RECEIVER IN A RADIO SYSTEM WITH MULTIPLE TRANSMITTERS

(75) Inventors: Robert Willem Rowe, Cambridge (GB); Ben Tarlow, Cambridge (GB); Christopher R. Drane, Sydney (AU); Simon David Hern, Cambridge (GB)

(73) Assignee: Cambridge Positioning Systems Limited, Cambridge (GB)

( * ) Notice: Subject to any disclaimer, the term of this patent is extended or adjusted under 35 U.S.C. 154(b) by 1262 days.

(21) Appl. No.: 10/544,072

(22) PCT Filed: Jan. 23, 2004

(86) PCT No.: PCT/GB2004/000281
§ 371 (c)(1),
(2), (4) Date: May 9, 2006

(87) PCT Pub. No.: WO2004/071120
PCT Pub. Date: Aug. 19, 2004

(65) Prior Publication Data
US 2007/0001867 A1   Jan. 4, 2007

(30) Foreign Application Priority Data
Feb. 5, 2003 (EP) ................................ 03250733

(51) Int. Cl.
*H04W 64/00* (2009.01)
(52) U.S. Cl.
USPC ......... 455/456.1; 455/406; 340/988; 340/996
(58) Field of Classification Search
USPC ........................................................ 455/406
See application file for complete search history.

(56) References Cited

U.S. PATENT DOCUMENTS 5,657,487 A * 8/1997 Doner .................... 455/456.2
5,689,270 A * 11/1997 Kelley et al. ............. 342/357.09

(Continued)

FOREIGN PATENT DOCUMENTS

DE   198 36 778 A1   2/2000
EP   0 582 344        2/1994

(Continued)

OTHER PUBLICATIONS

Martin Hellebrandt et al.; "Location Tracking of Mobiles in Cellular Radio Networks", IEEE Transactions of Vehicular Technology, vol. 48, No. 5, Sep. 1999; pp. 1558-1562.

(Continued)

*Primary Examiner* — Lester Kincaid
*Assistant Examiner* — Diego Herrera
(74) *Attorney, Agent, or Firm* — Roylance, Abrams, Berdo & Goodman, LLP (57) ABSTRACT

A method of determining the location of a mobile receiver is provided. The method works within a radio system in one or more dimensions, the radio system includes a network of transmitters the positions of which are known. The method comprises the steps of: compiling a list of the signals detected by the receiver, sending said list to a calculation device; constructing a position function which relates to the probability that the receiver is at a given location, which position function has components corresponding to each member of the list, each component including a predetermined probability function that depends on mobile receiver position; and evaluating said position function to determine a position that corresponds to the highest probability of location, and defining that position to be the location of the mobile receiver.

23 Claims, 5 Drawing Sheets

(56) References Cited

U.S. PATENT DOCUMENTS

| | | | |
|---|---|---|---|
| 5,768,686 A * | 6/1998 | LeBlanc et al. | 340/7.25 |
| 5,883,598 A * | 3/1999 | Parl et al. | 342/457 |
| 6,094,168 A * | 7/2000 | Duffett-Smith et al. | 342/463 |
| 6,108,553 A * | 8/2000 | Silventoinen et al. | 455/456.3 |
| 6,127,975 A * | 10/2000 | Maloney | 342/457 |
| 6,263,208 B1 * | 7/2001 | Chang et al. | 455/456.3 |
| 6,317,599 B1 * | 11/2001 | Rappaport et al. | 455/446 |
| 6,362,783 B1 * | 3/2002 | Sugiura et al. | 342/457 |
| 6,493,679 B1 * | 12/2002 | Rappaport et al. | 705/29 |
| 6,499,006 B1 * | 12/2002 | Rappaport et al. | 703/20 |
| 6,556,832 B1 * | 4/2003 | Soliman | 455/456.5 |
| 6,625,454 B1 * | 9/2003 | Rappaport et al. | 455/446 |
| 6,823,175 B1 * | 11/2004 | Zayana et al. | 455/67.11 |
| 7,224,983 B2 * | 5/2007 | Budka et al. | 455/456.1 |

FOREIGN PATENT DOCUMENTS

| | | |
|---|---|---|
| EP | 0 982 964 | 3/2000 |
| EP | 1 022 578 | 7/2000 |
| GB | 2 352 134 A | 1/2001 |
| WO | WO 98/10307 | 3/1998 |
| WO | WO 99/62284 | 12/1999 |
| WO | WO 02/054813 A1 | 7/2002 |

OTHER PUBLICATIONS

Uwe Hanebeck et al.; "Progressive Bayes: A Network Framework for Nonlinear State Estimation", Multisensor, Multisource Informatioh Fusion: Architectures, Algorithms, and Applications 2003, Proceedings of SPIE vol. 5099 2003, pp. 256-267.

Joe C. Chen et al.; "Maximum-Likelihood Source Localization and Unknown Sensor Location Estimation for Wideband Signals in the Near-Field"; IEEE Transactions on Signal Processing, vol. 50, No. 8, Aug. 2002; pp. 1843-1854.

Andrew M. Ladd et al.; "Using Wireless Ethernet for Localization"; Proceeding of the 2002 IEEE/RSJ International Conference of Intelligent Robots and Systems; 2002; pp. 402-408.

Teemu Roos et al., "A Statistical Modeling Approach to Location Estimation", IEEE Transactions on Mobile Computing, vol. 1, No. 1, 2002, pp. 59-69.

Stefano Panzieri et al., "An Outdoor Navigation System Using GPS and Inertial Platform", IEEE/ASME Transactions on Mechatronics, vol. 7, No. 2, Jun. 2002; pp. 134-142.

Daniel L. Alspach et al.; "Nonlinear Bayesian Estimation Using Gaussian Sum Approximations", IEEE Transactions on Automatic Control, vol. AC-17, No. 4, Aug. 1972.; pp. 439-448.

Kazufumi Ito et al.; "Gaussian Filters for Nonlinear Filtering Problems", IEEE Transactions on Automatic Control, vol. 45, No. 5, May 2000; pp. 910-927.

Bernard H. Fleury et al., Radiowave Propagation in Mobile Communications: An Overview of European Research; IEEE Communications Magazine, Feb. 1996, pp. 70-81.

T.S. Rappaport, et al.; "Position Location Using Wireless Communications on Highways of the Future", IEEE Communications Magazine, Oct. 1996, pp. 33-41.

"3rd Generation Partnership Project; Technical Specification Group Radio Access Network; Stage 2 Functional Specification of Location Services in UTRAN" (Release 1999); 3G TS 25.305 V3.1.0; 2000; pp. 1-45.

R. E. Kalman, "A New Approach to Linear Filtering and Prediction Problems", Transactions of the ASME, Journal of Basic Engineering, Series 82D, 1960, pp. 35-45, 1960.

Fred C. Schweppe, Uncertain Dynamic Systems, Chapter 11: Estimation: Static Nonlinear Systems, Prentice-Hall, New York, 1973, pp. 327-365.

Niclas Bergman, "Recursive Bayesian Estimation", Linköping Studies in Science and Technology, Dissertation No. 579, 1999, Chapter 3: Bayesian Estimations, pp. 21-43.

S. Kullback et al.; "On Information and Sufficiency", Annals of Mathematical Statistics, vol. 22, 1951, pp. 79-86.

Jaakko Lähteenmäki, "Radiowave Propagation in Office Buildings and Underground Halls", Proceedings of 22nd European Microwave Conference (EurMC'92); 1992; pp. 377-382.

A. Papoulis; Probability, Random Variables, and Stochastic Processes; Chapter 4: The Concept of a Random Variable; McGraw-Hill; 1965; pp. 83-115.

Jörg Eberspächer et al, "GSM-Switching, Services and Protocols", John Wiley & Sons, 1999, pp. 1-26.

Niclas Bergman et al. "Terrain Navigation Using Bayesian Statistics", IEEE Control Systems, vol. 19, Jun. 1999, pp. 33-40.

Andreas Rauh, "Nonlinear Measurement Update and Prediction: Prior Density Splitting Mixture Estimator", Submitted Dec. 2002 to IEEE Transactions on Automatic Control, 8 pp.

The Digital Cordless Telecommunications Standard for the World, DECT Forum 2003, printed Nov. 17 & 28, 2005 from web.archive.org/web/20030423142003/, 6 pages.

International Search Report for International Application No. PCT/EP2004/003320, mailed Nov. 23, 2004.

* cited by examiner

Serving Cell  Neighbour cells  — 401

| BCCH | BSIC | MNC | MCC | CI | LAC | ....... | BCCH | BSIC | N | Q | ...... |

402

| Visible list | | | | | | |
|---|---|---|---|---|---|---|
| Base Station | Q | Antenna pattern | Main lobe | Type | Longitude | Latitude |
| 304 | 20 | A | 0 | S | long 1 | lat 1 |
| 302 | 10 | B | 120 | N | long 2 | lat 2 |
| 301 | 12 | A | 270 | N | long 3 | lat 3 |
| 303 | 15 | C | 90 | N | long 4 | lat 4 |
| | | | | | | |

403

| Not-visible list | | | | |
|---|---|---|---|---|
| Base Station | Antenna pattern | Main lobe | Longitude | Latitude |
| 305 | C | 180 | long 5 | lat 5 |
| 307 | D | 240 | long 6 | lat 6 |
| 308 | B | 90 | long 7 | lat 7 |
| 309 | A | 0 | long 8 | lat 8 |
| | | | | |

METHOD AND SYSTEM FOR LOCATING A MOBILE RADIO RECEIVER IN A RADIO SYSTEM WITH MULTIPLE TRANSMITTERS

TECHNICAL FIELD

This invention relates to multiple transmitter radio systems and in particular to locating the position of a mobile radio receiver in a system where there is a plurality of transmitting stations each located at a different geographic location in order to provide the area of interest with adequate radio coverage.

DESCRIPTION OF RELATED ART

Conventional systems for locating radio receivers using a plurality of transmitters use different techniques for measuring the characteristics of the received signal to find the position of the receiver. These can be characterised as time referencing, phase referencing, or spatial referencing, or techniques which combine these three types.

In time referencing systems, for example the Loran C system set up by the US coastguard, the radio transmissions take the form of radio pulses whose time of arrival at the mobile receiver can be accurately measured. The receiver is of a special type that can determine time differences between the reception of pulses from each of a pair of transmitters in the system. This information defines a curve connecting points of equal time difference on which the receiver must lie. By similar measurements of multiple transmitter pairs, further intersecting curves enable the receiver's position to be determined as the point of intersection of the curves which best satisfies all the measured time differences.

An extension of this system is the Global Positioning System (GPS) which uses the reception of signals from a number of satellite transmitters that are synchronised in time and which also transmit their positions to the receiver. The receiver measures the time of arrival of a defined point in the received data stream from each satellite with reference to the receivers internal time source. Each measurement defines a sphere on which the receiver must lie and the radius of which is fixed by the time of flight of the radio waves from the satellite. Similar measurements using different satellites in different positions create multiple intersecting spheres. The receiver's position can be determined, by solving the simultaneous equations for the distances to the satellites and the receivers time offset, as the point of intersection of the spheres which best satisfies all of the measured time delays and the receiver clock offset.

Systems that use phase measurements include the Decca Navigation system and the Omega system. The mobile receiver measures the relative phase of the received signal from special transmitters which have phase synchronised transmissions, either with respect to each other or with respect to an internal phase reference. By knowing the positions of the transmitters and the predicted phase received at all points in the covered area, the position of the receiver consistent with a particular set of phase measurements may be determined.

All of the above systems require dedicated and expensive transmitter systems with specialised receivers.

Another prior art method, for example U.S. Pat. No. 5,859,612-A uses the directional nature of the transmitted signals. This has been applied in a method which uses a beam of identifiable modulation, which synchronously sweeps a defined area from a known start position and start time. By knowing when the beam started its sweep and the reception time of the defined modulation, the receiver's position can be determined to be on a radial line of certain direction from the source transmitter. Similar receptions from multiple sources can fix the receivers position in two dimensions by establishing the point that best satisfies all radial line bearings simultaneously.

Spatially-fixed beams of radio transmissions that have narrow transmission patterns from fixed antennas can also be used to determine the position of a receiver. By knowing which directional pattern of the overall transmitted pattern is received, then the position of the receiver within a sector centred on the transmitting station can be determined. The reception of narrow beams from multiple overlapping transmitter patterns can similarly fix the receiver in space by searching for the point that best satisfies all the beam directions to the transmitting stations.

The above system also requires dedicated transmitters, but these are usually localised in particular areas of interest. The accuracy of the system diminishes rapidly as the beam-width, and therefore the exact bearing of the receiver, increases. The receivers are generally less specialised than time- or phase-measuring receivers and can share their positioning function with other functions such as weather report reception.

The above last method that uses the directional patterns of transmissions from fixed base transmitter stations can be applied to digital radio cellular systems. In such systems the area to be covered by the communication service is serviced by a plurality of fixed transmitting and receiving stations, usually co-located. The area covered by a single fixed transmitter site on one of its directional antenna patterns is called a sector or a cell. The combination of all of the cell positions has been designed to enable a large number of mobile transmitters and receivers in a large geographic area to be in continuous communication with at least one of these fixed transmitter-receivers (the serving base station) as the mobile station moves in any arbitrary direction. The fixed transmitter-receiver in this system is usually called a base station and the mobile receiver may receive the transmissions of neighbouring base stations because their antenna patterns overlap with that of the serving base station. In any particular case, the base station that the mobile receiver uses to connect to the underlying service network changes as the receiver moves with respect to the fixed network. This process is called handoff and it ensures that the mobile receiver's communications traffic is passed smoothly from one base station to another so that there is no lapse in service.

To enable the handoff process the cellular mobile receiver receives transmissions from a plurality of base stations. Related art shows how these transmissions made for telecommunication purposes may be also be used by the mobile receiver, or in a processing device in communication with the receiver, to calculate the receiver's position. These prior art methods will now be described along with their disadvantages.

As described in U.S. Pat. No. 6,108,553-A the mobile receiver may measure the relative time delay between the signals received from two transmitted by time synchronised base stations. These measurements, when taken from several different pairs of base station transmissions, form an intersecting set of hyperbolic curves. The point that best satisfies the intersection of all of these curves predicts the position of the receiver.

The mobile receiver may also measure the reception of signals from each base station with reference to its own internal clock, see for example WO 97/11384 WO 99/21028. This reception time may then be combined with measurements of the same transmission made at other external measurement receivers in the network. The combined measurement information can then be combined in the handset or in other generalised computing means to provide a set of intersecting circles centred on the transmitters. The position of the handset is calculated to be at the point of intersection of the circles.

The preceding techniques require additional equipment to be installed and maintained at the transmitters in the network to enable timing measurements, and the handset must also be modified from its normal communications function to make additional timing measurements.

The prior art described in U.S. Pat. No. 5,293,642-A also describes position estimating techniques using the spatial characteristics of radio waves applied to cellular systems. In these systems the base station receiver measures the radio propagation parameters of the signals transmitted by the mobile station transmitter. These may include signal strength and travel time. The parameters are then used, together with knowledge of the base station antenna pattern, to derive a probability density function (centred on each base station) of a mobile receiver giving the predicted signal strength at any position. By combining this probability density function with similar probability density functions centred on other base stations, a maximum in the joint probability density functions is derived which can be interpreted as being the maximum-likelihood position of the mobile station.

In other prior art, for example U.S. Pat. No. 5,613,205-A, a mobile receiver measures the relative signal strengths of the control signals received from a plurality of base stations. The system then calculates the distance between the receiver and each base station as a function of the base station transmitted power, received power and the signal attenuation factors in the radio path from each base station to the mobile receiver.

Simpler systems for positioning mobile receivers have also been described. One of these takes the centroid of the serving cell as the handset's position. Another measures the signal strength of the neighbouring cells and take the centroid of that with the biggest signal level as the best indication of the position of the receiver as in WO 98/35524.

These particular prior art systems and methods are unreliable for estimating position since the centre of the serving cell may not be the closest approximation to the position of the receiver, and the cell is of indefinite shape and subject to anomalous propagation conditions. The signal level measurement of a single base station signal might also be erroneous for similar reasons. These techniques suffer from the highly unpredictable nature of the radio propagation path and the inaccuracies surrounding the mathematical models. In particular, estimated power levels do not usually conform to simple Gaussian distributions, especially when subject to multi-path fading. Of course, the actual power received at a number of points in the network may be determined a prior by employing a mobile test set which is calibrated for position and signal strength. However, such measurements are costly and time consuming to make, and can make no allowance for the changeable nature of real networks over time between measurements.

The present invention is designed to overcome many of the shortcomings of the systems in the prior art outlined above. In particular, the position of a mobile receiver in a communications network can be established with relatively high accuracy using only measurements made by the receiver without the need to provide additional equipment in the network nor to carry out periodic calibrations of signal reception.

SUMMARY OF THE INVENTION

According to the present invention, there is provided a method of determining the location of a mobile receiver in one or more dimensions in a radio system which includes a network of transmitters the positions of which are known, the method comprising the steps of:

a) compiling a list of the signals detected by the receiver;
   b) sending said list to a calculation device;
   c) constructing a position function which relates to the probability that the receiver is at a given location, which position function has components corresponding to each member of the list, each component including a predetermined probability function that depends on mobile receiver position; and
   d) evaluating said position function to determine a position that corresponds to the highest probability of location, and defining that position to be the location of the mobile receiver.

The detection of signals by the receiver may include the reception of signals transmitted by a particular transmitter of the network and the decoding of information from the signals. It may also include identification of a particular signature, such as a synchronisation pattern or a pilot code, in signals received above a given threshold power, or it may simply be the reception of signal power on a particular frequency above a given threshold.

The list of signals detected by the receiver may, for example, include decoded information such as the identifications of the transmitters, or it may consist of a list of frequencies on which signals above a given threshold power were received, or it may simply consist of a list of references to another list, known to the calculation device, which contains information about the transmitters The calculation device may be attached to the mobile receiver, or it may be at any location able to receive the list sent by the receiver.

The predetermined probability function may be based on a propagation model for the radio waves between each transmitter and the receiver assumed to be at that position, said model taking into account characteristics such as the transmitter power, transmitter antenna pattern, travel distance, and the variable transmission characteristics (such as fading) of signal propagation. Preferably, the predetermined probability function is proportional to the probability of detection of the signals from that transmitter, and hence possible membership of the list. Alternatively, the said predetermined probability function may be based on a heuristic derived from detections obtained at calibration points. For example, it may be found in practice that the probability of detection of the signals from a transmitter at a particular point in the area covered by that transmitter can be approximated by a two-dimensional Gaussian function centred near the middle of the area. Use of such a heuristic can give very good results since it is based on real measurements rather than a theoretical model.

The list may be augmented, or a second list constructed, to include information from signals that were not reported by the receiver, but which could have been detected had the signal propagation characteristics been favourable. In these cases, the position function may be modified to take account of the probability of non-appearance in the list.

The position function may also be affected by the reliability of the detection of each of the signals by the receiver. An estimate of the reliability could, for example, be proportional to the difference between the received power level and the detection threshold, or it may be a measure of the number of times a given signal is detected in a repeated series of measurements. The reliability measure could be transmitted in the messages communicated from the mobile receiver, either as part of the list or in a separate message.

In some applications, it may be an advantage for the receiver to sort the list before sending it. For example, the received signal power or the reliability measure described previously could be used for sorting.

Digital communications systems often measure the round-trip time of flight of signals from the serving transmitter to the mobile receiver and back again. The measurement is used to advance the timing of the signals transmitted by the handset transmitter so that they arrive at a known time at the base station. Where it is available, this so-called timing advance value (TA) can preferably be included in the position function, for example by assigning an additional probability that the mobile receiver is at the given location given the measured value.

The calculation of the position of the receiver using the position function to find the position corresponding to the highest probability can be carried out in a number of ways. Preferably, the position function is a 'cost function' which describes the logarithm of the reciprocal of the probability as a function of the location of the receiver and membership of the list. This cost function has the lowest numerical value corresponding to the location which is most likely to give the measured list of detected signals, including, if available, the list of signals not detected and the measured TA and any reported ordering of the list. This minimum value can be found by any one of a number of well-known general mathematical minimisation techniques including (a) analytical analysis in which the position function can be manipulated to give the solution directly, (b) iterative methods which generally seek to move a current estimate of the solution 'down the slope' in such a direction as to move closer to the minimum point, and (c) 'grid methods' in which the position function is evaluated at every point of a grid of positions with the position corresponding to the lowest value being taken as the result. These methods are described in many textbooks, for example, *Numerical Recipes in C++, Second Edition* by William H. Press et al, Cambridge University Press, Chapter 10 pages 401-429.

The current invention therefore provides a method of obtaining the position in one or more dimensions of a mobile receiver by estimating its location in, for example, a geographic area that has a number of receivable and identifiable radio transmissions established within it. The method does not rely on a detailed knowledge of the transmission modulation type or content or time delay measurements. It can therefore be applied to any radio system of any modulation type without knowledge of the system timing.

The mobile receiver at a given position receives signals from one or more of the transmitters in the network. Those that are detected can be called 'visible' and can be added to the list maintained of visible stations. The position of the receiver affects which transmitting stations are visible to it. A system according to the present invention may also maintain a list of those transmitters that cannot be received and are called 'not visible', but are known to exist and be active, at the time of the position measurement. The receivers position affects which transmitting base stations are not visible.

At any given location it is possible to predict theoretically which transmitters are visible and which are not visible, depending upon factors such as the distance from the transmitting station, the transmitted power of the transmitter, and the direction of the transmitter radiation pattern. According to one implementation of the invention, each transmitter in the visible and not-visible lists is assigned a 'cost' function. This cost function describes the combination of the transmitter power, transmitter radiation pattern, distance and bearing of the transmitter from the receiver, radio propagation characteristics, and (where available) other characteristics such as timing advance or local topological data, which best models the probability of detection of the signals by the mobile receiver. For mathematical convenience, the cost function combining all the characteristics affecting the visibility of the transmitters is made proportional to the negative of the logarithm of the probability of detecting their signals (i.e. the logarithm of the reciprocal of the probability). Hence taking one transmitter in isolation, the cost function describing its visibility has a low value when the receiver is close to the transmitter position and directly in line with the transmitter antenna's forward lobe as shown, for example, in FIG. 1. The cost function gradually increases as the receiver moves directly away from the base station, or moves tangentially at an angle from the direction of the forward lobe at fixed distance from the transmitter. The corresponding cost functions describing each transmitter are then combined as a sum to give an overall cost function that describes the combined visibility of the transmitters as shown for example in FIG. 2. The minimum of this overall cost function is the position of the receiver according to the invention.

According to the present invention there is provided a mobile receiver device, capable of detecting signals from a plurality of transmitters and arranged to compute a list of signals received by the mobile receiver and to send said list, in use, to a calculation device.

Furthermore, according to the present invention there is provided a calculation device for use in location determination of a mobile receiver, the calculation device being arranged to:
  a) receive a list of the signals detected by a receiver,
  b) construct a position function which relates to the probability that the receiver is at a given location, which position has components corresponding to each member of the list, each component including a predetermined probability function that depends on the mobile receiver position; and
  c) evaluate said position function to determine a position that corresponds to the highest probability of location, and defining that position to be the location of the mobile receiver.

According to the present invention there is provided a system comprising: a mobile receiver device and a calculation device.

The calculation device may be attached to the mobile receiver, or it may be remote from, but in communication with, the mobile receiver.

DETAILED DESCRIPTIONS OF PARTICULAR EMBODIMENTS

Figure 3:
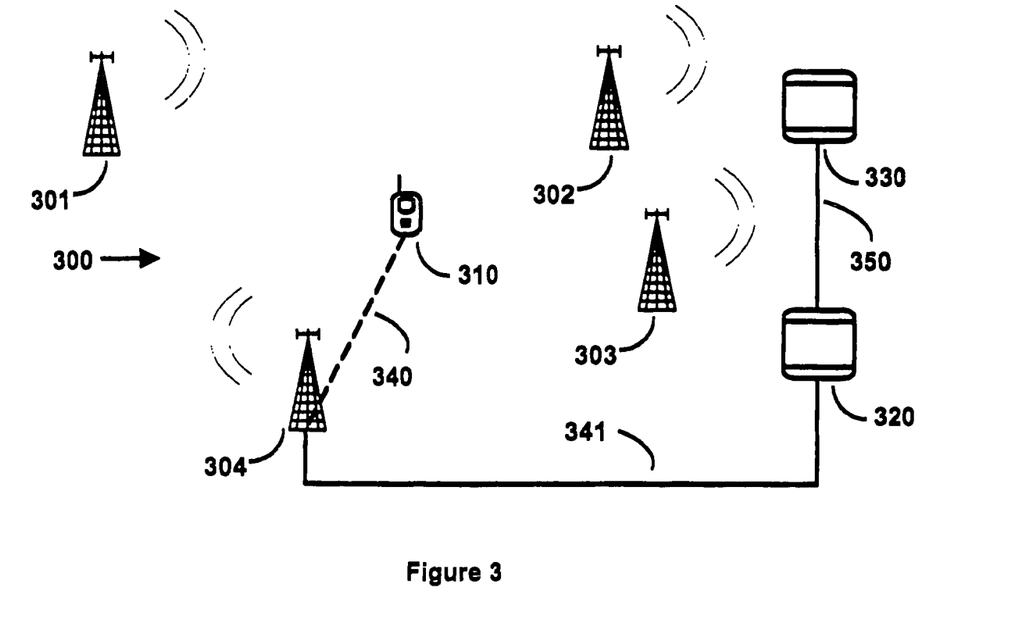
FIG. 3 illustrates an example multiple transmitter system.

A mobile receiver positioning system has been implemented according to the current invention using an existing GSM mobile telephony network (see FIG. 3). The system 300 comprises a plurality of transceiver base stations 301, 302, 303, 304, which act as the transmitters described above, a handset which acts as the mobile receiver 310, a location calculation unit (LCU) 320, and a management database (MDB) 330. The base stations provide the signal transmissions which are detected by the handset 310 and processed in the LCU 320 using the mathematical algorithms described below.

Figure 4:
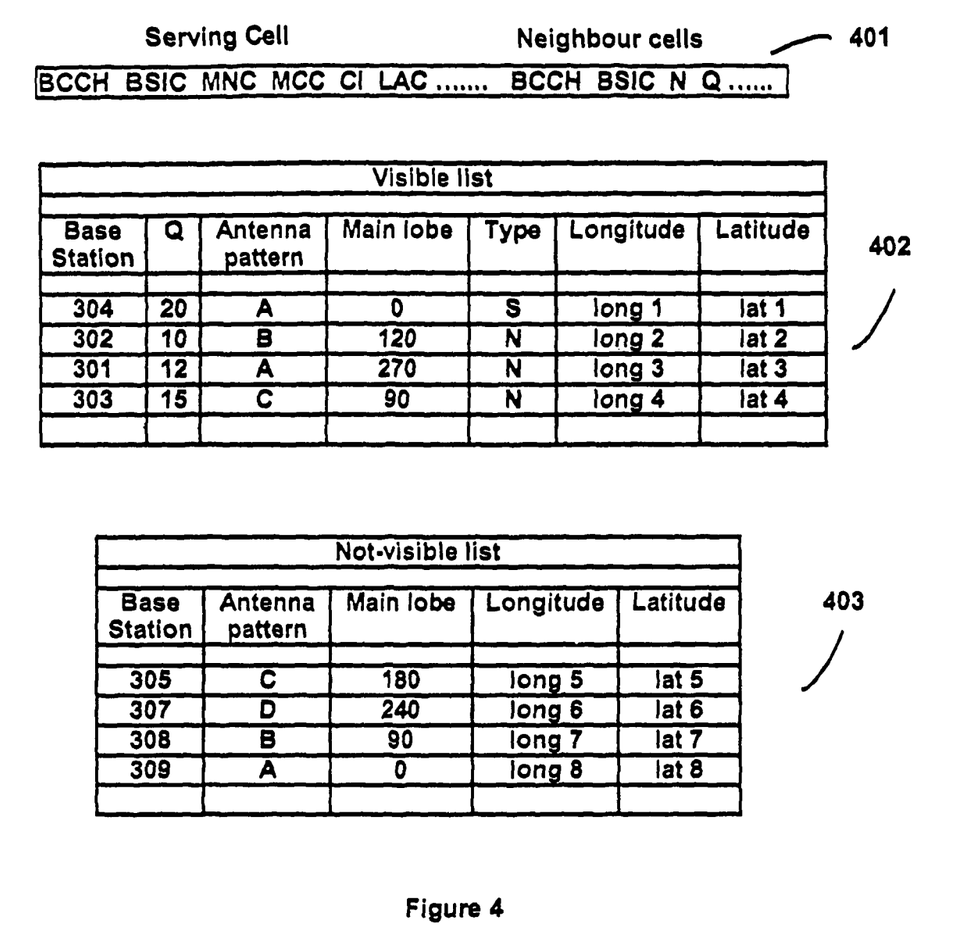
FIG. 4 shows an example list of detected signals sent by the handset, and examples of lists maintained at the location calculation unit of visible and not-visible signals.

The handset 310 detects signals from a number of the nearby base stations 301-304, compiles a list of those it detects, and sends the list via a message over link 340 to the serving base station 304. The format and content of the message is shown in FIG. 4 at 401. It is defined by the GSM standard and includes fields for the Broadcast Control Channel, BCCH, the Base Station Identity Code, BSIC, the Mobile Network Code, MNC, the Mobile Country Code, MCC, the Cell Identifier, CI, the Local Area Code, LAC, the number of measurements taken, N, and an indicator of the measurement quality, Q. Message 401 includes some or all of these fields for each base station signal it detects. The 'neighbour cell' information, i.e. the data corresponding to the base stations other than the serving base station with which the handset is in two-way communication, are sorted in order of received signal power level. Communications links 340 & 341 are available as part of the telephony system.

Additional data are supplied to the LCU 320 from a Management Data Base 330 which include the identifications (CI, BSIC etc.) and locations of the fixed base stations, their corresponding antenna patterns and their transmitter powers. These data are available as part of the standard configuration of the network contained within the management system database 330 and communicated to the LCU by link 350. The LCU 320 uses the message 401 to create a list 402 of visible base stations. The table shows the base station identifier, the quality value associated with the detection, the transmitting antenna pattern type, the pointing direction of the main lobe of the transmitter antenna, a flag indicating whether the detected signal was from the serving base station (S) or was a neighbour base station (N), and the position of the base station.

The LCU 320 also generates a list 403 of the base stations known to be active in the system using the management information, but which are not present in the list 402 of visible base stations.

The handset 310 is in time-synchronous communication with its serving base station 304 and the TA value is also communicated to the LCU 320 from the network via the link 341 in another message (not shown in FIGS. 3 and 4).

In order to determine the position of the handset 310, the LCU 320 uses the lists of visible 402 and not-visible 403 base stations, and the TA value associated with the serving base station, to construct an function which describes the probability that the handset is at a given horizontal position within the GSM network, given the TA value and the membership of the visible and the not-visible lists. The position which corresponds to the maximum probability is returned as the position of the handset.

The calculations involved in the specific embodiment are now described.

In order to determine the position of the handset, the LCU 320 finds the position which minimises the function $$C_{TOT} = C_{TA} + C_V + C_N, \qquad (1)$$

where $C_{TOT}$ is the function whose minimum indicates the most likely position of the handset, $C_{TA}$ is the function associated with the timing advance measurement, $C_V$ is the function associated with the base stations in the visible list, and $C_N$ is the function associated with the base stations which are in the not-visible list.

The functions $C_V$ and $C_N$ are both similarly evaluated as a sum over all N base stations as $$C = -\sum_{n=1}^{N} \log_e(P_n), \qquad (2)$$

where $P_n$ is the probability that the $n^{th}$ base station is visible (in the case of $C_v$). There are two preferred ways of calculating this value, the Gaussian Version and the Power Version, as follows.

Gaussian Version

In this version the probability of the handset detecting a signal from a transmitter is modelled by a Gaussian probability distribution. A two-dimensional Cartesian coordinate system is set up centred on the base station with the x-axis oriented along the direction of the transmitting antenna's forward lobe. The Gaussian distribution is centred on the x-axis at position $(x_0, 0)$. The probability, P, that the handset at vector position x detects the signals from the transmitter at position $(0,0)$ is given by $$P(x) = \exp\left(-\frac{1}{2}(x - x_0)^T \cdot A \cdot (x - x_0)\right), \qquad (3)$$

where $$x = \begin{bmatrix} x \\ y \end{bmatrix}, \quad x_0 = \begin{bmatrix} x_0 \\ 0 \end{bmatrix}, \quad A = \begin{bmatrix} 1/\sigma_x^2 & 0 \\ 0 & 1/\sigma_y^2 \end{bmatrix},$$

x and y are the co-ordinates of the receiver, and $(\;)^T$ denotes the transpose of the matrix within the braces. That is, the distribution has its peak at the position $x_0$ on the x-axis, and has a standard deviation of $\sigma_x$ in the x-direction and $\sigma_y$ in the y-direction with no covariance terms.

It is convenient to work with a cost function, f(x,y), which is proportional to the negative of the logarithm of P(x,y), i.e.

$$f(x,y) = -2 \log_e P(x,y). \qquad (4)$$

The definition of f(x,y) given above uses coordinates relative to the position and bearing of a particular base station. When combining the distributions for all the cells in the visible list, it is convenient to use a reference coordinate system which has an arbitrary origin somewhere close to the expected position of the handset and in which the x-axis is aligned to the east and the y-axis is aligned to the north, so that a coordinate transformation must be applied to each term in the summation. If a base station k has location $(x_k, y_k)$ relative to the reference coordinates and bearing $\phi_k$ measured in radians anti-clockwise from east, then its contribution to the cost function will equal $$f(x_k, y_k) = (x - z_0)^T \cdot B \cdot (x - z_0), \qquad (5)$$

where

-continued $$z_0 = \begin{bmatrix} x_k \\ y_k \end{bmatrix} + R^T \cdot \begin{bmatrix} x_0 \\ 0 \end{bmatrix}, B = R^T \cdot \begin{bmatrix} 1/\sigma_x^2 & 0 \\ 0 & 1/\sigma_y^2 \end{bmatrix} \cdot R, \text{ and}$$

$$R = \begin{bmatrix} \cos\phi_k & \sin\phi_k \\ -\sin\phi_k & \cos\phi_k \end{bmatrix}.$$

The parameters $x_0$, $\sigma_x$ and $\sigma_y$ vary from cell to cell and can be derived using heuristic methods. In one implementation of the present invention, the results of measurements made at many known locations across the network were used to find the values which gave the lowest overall error when the positions were re-calculated using the present method. Once calibrated in this fashion, the method was then used to locate handsets at unknown positions.

The formula for addition of functions of the form $f(x_k,y_k)$ is such that $$(x-z_1)^T \cdot B_1 \cdot (x-z_1) + (x-z_2)^T \cdot B_2 \cdot (x-z_2) = (x-z_R)^T \cdot B_R \cdot (x-z_R) + e, \quad (6)$$

where $B_R = B_1 + B_2$ and $z_R = B_R^{-1} \cdot (B_1 \cdot z_1 + B_2 \cdot z_2)$. The term e is a constant, and hence is irrelevant since we are interested only in the location of the function's minimum and not its absolute value. At the minimum point, the gradient of the function is zero. Since the gradient of a constant is always zero, the term e makes no contribution.

From this it is clear that the total cost function, C, for all the base stations can be reduced to a simple expression of the form $$C = (x-z_S)^T \cdot B_S \cdot (x-z_S), \quad (7)$$

where the values of $z_S$ and $B_S$ are derived from the positions, and bearings of all of the base stations in the visible list by repeated use of equation 6. The function C has a unique minimum at the point where $x=z_S$, so there is no need in this case to perform a minimisation through the use of an Iterative numerical technique.

Power Version

In order to calculate P using this method it is first necessary to find the power received on average by the handset from a given base station. The average is used here so that no account need be taken of the handset receiver's antenna pattern, which in real use points in any arbitrary direction. If the handset is at distance r from the base station and at bearing angle θ relative to the transmitter main lobe axis, then the average signal power received by the handset is given by $$R(r,\theta) = G(\theta) W_0 \gamma r^{-\beta}, \quad (8)$$

where $R(r,\theta)$ is the average received signal power, $G(\theta)$ is the transmitter antenna gain, $W_0$ is the transmitted power, γ is a log-normal random variable (see below), and β is the exponent of power loss. The assumption is made that the handset has an omni-directional antenna pattern, which is not true in each instance in practice, but is a good model for the average. The log-normal variable represents the variability of the signal power characteristics of the radio path (see below).

Taking the logarithm of both sides of equation (8) produces $$\log_e(R(r,\theta)) = \log_e(G(\theta)) + \log_e W_0 + \log_e \gamma - \beta \log_e r. \quad (9)$$

The log normal variable can be modelled as $$\gamma = \gamma_0 e^m, \quad (10)$$

where $\gamma_0$ is the median value and m is a normally-distributed random variable with a variance of $\sigma^2$. Substituting equation 10 into equation 9 gives $$\log_e(R(r,\sigma)) = \log_e(G(\theta)) + \log_e W_0 + \log_e \gamma_0 + m - \log_e r. \quad (11)$$

As explained in the following paragraph, this indicates that the logarithm of the received power level is a Gaussian distributed variable, with a probability density function (PDF) given by $$PDF(\log_e R) = (2\pi\sigma^2)^{-1/2} \exp[-(\log_e R - \overline{L})^2/(2\sigma^2)], \quad (12)$$

where $\overline{L} = \log_e(G(\theta)) + \log_e W_0 + \log_e \gamma_0 - \beta \log_e r$.

The handset detects a base station and lists it as 'visible' if the received power level is above the minimum detectable signal power, $R_{min}$. This is depicted diagrammatically in FIG. 5. The graph shows the logarithm of received power, log R, plotted against the logarithm of the distance from a base-station transmitter, log r, on axes 500 and 501 respectively and the result is a straight line 502. An example point is shown by label A at a distance from the transmitter indicated by line 503 and with a predicted received power given by line 504. When many measurements of the received power are made at the same distance from the transmitter, the results are found in practice to vary and in general follow the probability distribution shown by the curve 505. This is a normal distribution on a logarithmic plot, and hence this variability is best described by the log-normal variable, γ, as discussed previously.

Figure 5:
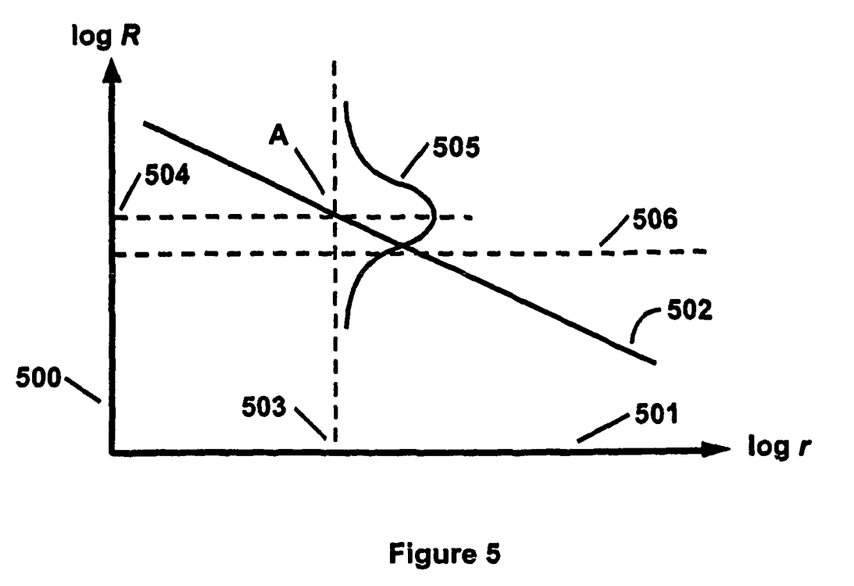
FIG. 5 illustrates the variation of received power with distance from the transmitter.

Line 506 is the minimum receive power, $R_{min}$, able to be detected by the receiver. The probability, P, of detecting the signals at point A is therefore given by the area under the curve 505 above the threshold line 506. Mathematically this is given by the integral $$P = \text{probablility that } \log_e R > \log_e R_{min}, \quad (13)$$

i.e.

$$P = \int_{\log_e R_{min}}^{\infty} (2\pi\sigma^2)^{-1/2} \exp\left[-(\log_e R - \overline{L})^2/(2\sigma^2)\right] d(\log_e R). \quad (14)$$

An integral of this sort is widely known to be related to the 'Error Function', Erf (see for example, in Numerical Recipes in C++ by William H. Press et al, Cambridge University Press, Chapter 6 page 225). Hence P is given by $$P = (1 + Erf((\overline{L} - \log_e R_{min})/\sqrt{2}\sigma))/2. \quad (15)$$

As with the Gaussian version described previously, it is mathematically convenient to use a 'cost' function, C, which is the negative logarithm of P, i.e.

$$C = -\log_e(P). \quad (16)$$

This function has a minimum value at the position where the probability is a maximum. This cost function is plotted in FIG. 1 under the assumption that the antenna pattern, $G(\theta)$, is a $\cos^2\theta$ function. The x and y horizontal axes are the position axes relative to the base station position. The vertical axis is the cost function value shown on an arbitrary scale of 0 (low cost) to 10 (high cost).

Figure 1:
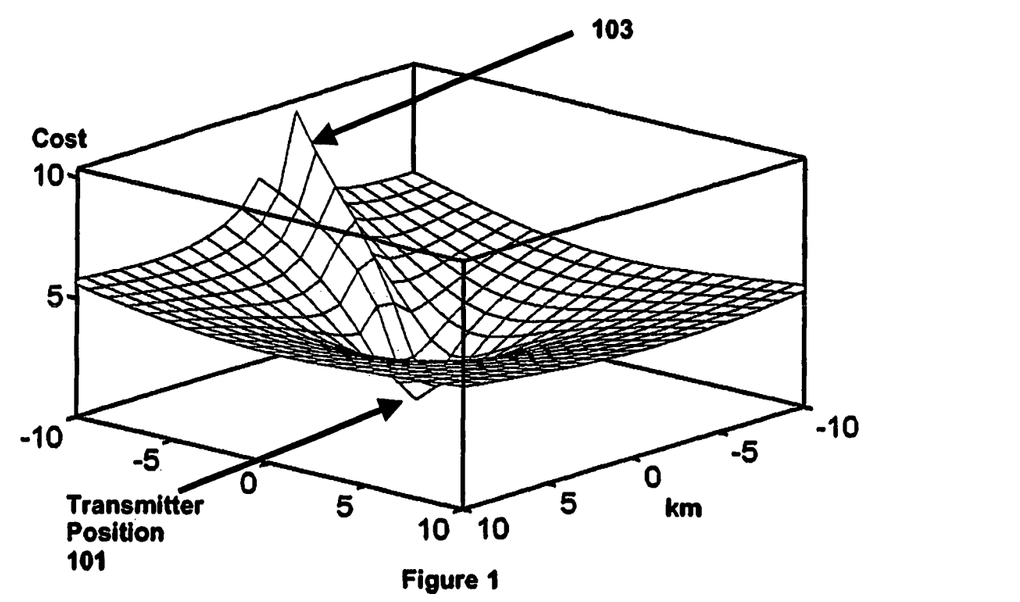
FIG. 1 shows an example plot of the position function ('Cost') associated with a single transmitter.

There are several distinctive features of the plotted surface in FIG. 1. The first is that there is a low central region 101 around the transmitter base station position where the cost of being detected by the receiver is a minimum. This is because the power levels there are so high that even with an unusual degree of channel attenuation variation the received power level is still above the minimum. The second is that that there is a high cost 103 in the directions of the antenna nulls.

Figure 2:
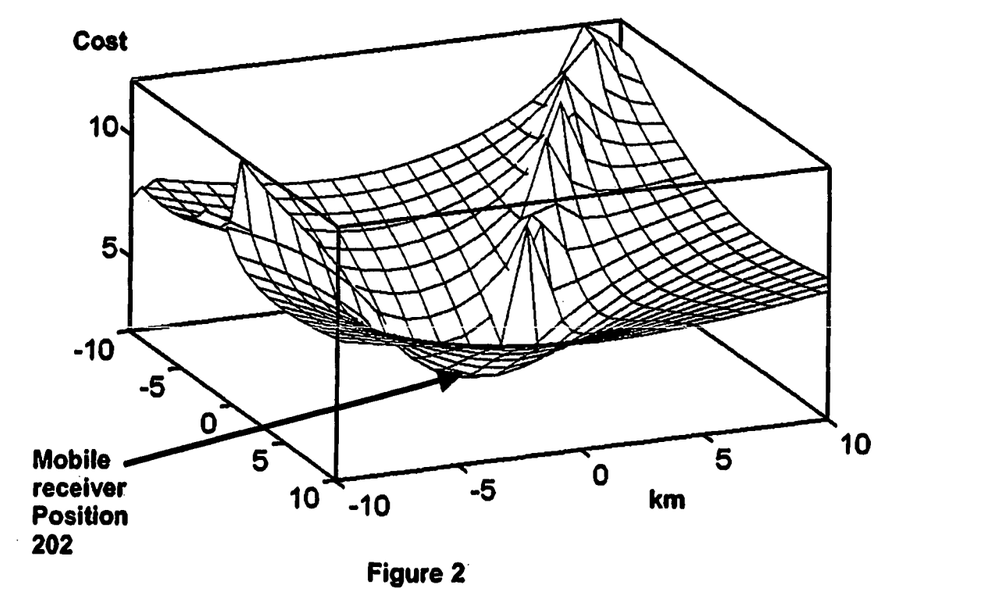
FIG. 2 shows an example plot of the position function ('Cost') associated with multiple transmitters.

When this analysis is extended to include all the signals from all the BTSs, and combined into a single cost function, the shape is similar to that shown in FIG. 2. The axes in this figure are centred on the handset's position 202.

Figure 6:
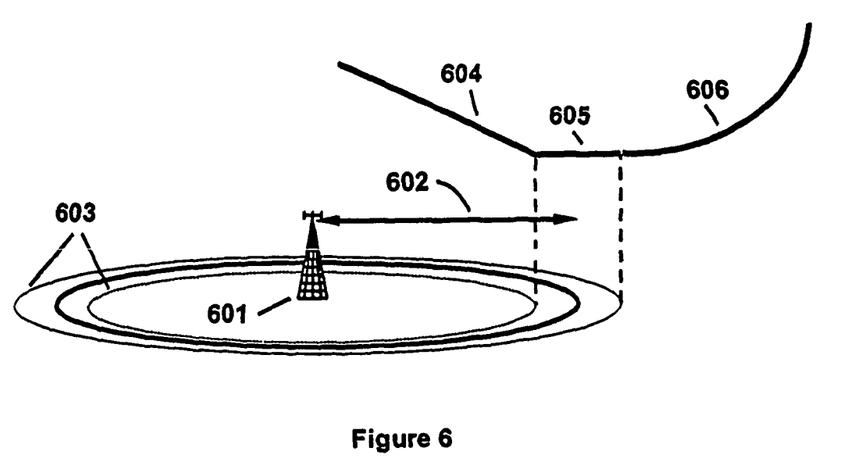
FIG. 6 shows an example fixed transmitter and a plot of the position function component associated with timing advance.

In the preferred embodiment the corresponding cost function associated with the timing advance measurement, $C_{TA}$, is as shown diagrammatically in FIG. 6. This figure depicts a view of a base station 601 and a graphical representation of the timing advance distance, 602, which would, ideally, be calculated from a measurement of the TA value by multiplying by the speed of radio waves. In practice in a GSM system, the reported TA value measured at a particular radial distance, 602, is quantised by the measurement method into units of about 550 meters or half a GSM 'bit'. This means that the radial distance from the base station, 602 ($D_{TA}$), has on average a plus/minus quarter-bit equivalent distance error, as shown by the concentric circles 603. The cost function 604-606 which is applied in the specific embodiment is shown superimposed above this diagram. In summary any positions which are closer to the base station than a quarter of a bit from the measured TA distance ($D_{TA}$-225 m) are given a cost value 604 proportional to the difference from this position. Position within the ambiguous band of plus/minus a quarter of a bit around the measured distance are given a zero cost value 605. Positions further away than a quarter bit beyond the TA distance ($D_{TA}$+225 m) are given a value proportional to the square of the difference from this position 606.

Figure 7:
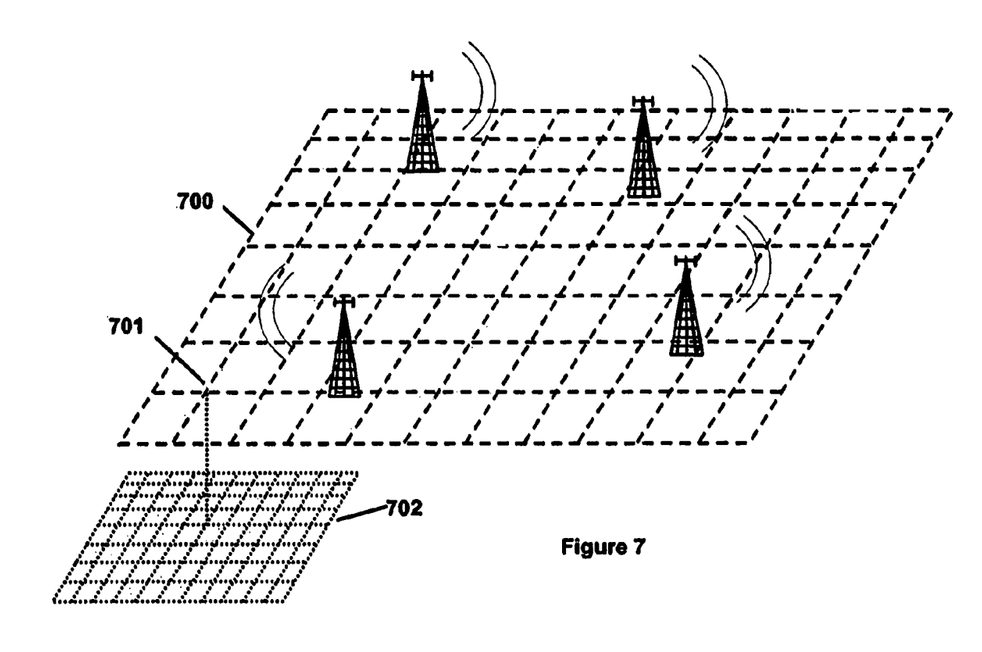
FIG. 7 illustrates a calculation grid.

In the preferred embodiment the minimum of the combined cost function $C_{TOT}$ is found as follows. The base station positions are projected onto a horizontal plane, and points are identified forming an equal distance grid in the two horizontal directions within this horizontal plane common to all base stations. This is shown diagrammatically in FIG. 7 with the grid 700 shown superimposed on the horizontal plane common to all base stations. An example point 701 is identified on the plane. The total cost function $C_{TOT}$ is evaluated at each of these grid points and that corresponding to the lowest value of $C_{TOT}$ is found. In FIG. 7 this is shown as example point 701. This point is then taken as the centre of another square array of grid points at one tenth of the spacing 702. $C_{TOT}$ is again evaluated at each point of this sub-grid and the minimum found. This point is then used as the centre of yet another set of grid points at which $C_{TOT}$ is evaluated and so on, until the sub-grid spacing is equal to 10 m. The point corresponding to the lowest value of $C_{TOT}$ is used as the estimate of the position of the mobile receiver.

Trials according the specific embodiments described under 'Gaussian Version' and 'Power Version' above have been carried out in several GSM networks. For example, in one of these the Gaussian Version was used. A total of 319 test points were selected which were scattered randomly over the test area, and at each the position of a handset measured according to the invention was compared with the true position as measured by more accurate means (the 'ground truth'). The results showed that two thirds of the positions were within 220 m of ground truth, and that nineteen out of twenty were within 380 m.

The invention claimed is:

1. A method of determining the location of a mobile GSM receiver in one or more dimensions in a radio system which includes a network of GSM transmitters in which each of the transmitters transmit signals on a respective particular frequency and the positions of which transmitters are known, said GSM receiver configured to receive signals from said GSM transmitters, a mobile GSM and GSM network, the method comprising the steps of:
  a) detecting signals received by the mobile GSM receiver received from the transmitters that are visible in said network, a mobile GSM and GSM network, each of which visible signals is above a predetermined power level on its respective particular frequency and which can include signals from non-serving transmitters and a serving transmitter, said detecting including decoding from each of said received signals above said predetermined power level, information relating to the identity of the corresponding one of said transmitters in the network;
  b) compiling, in the mobile receiver, a list of the visible transmitters including information relating to the identity of said corresponding transmitters;
  c) sending said list to a calculation device;
  d) creating in the calculation device a further list of transmitters which are in said network of GSM transmitters but not detected by the mobile receiver;
  e) constructing a position function which relates to the probability that the receiver is at a given location, which has components corresponding to each transmitter in the list of visible transmitters, to each transmitter in the further list of transmitters not detected by the mobile receiver, each component including a predetermined probability function that relates to the probability that the receiver is at a particular location given the transmitters in said list and said further list; and
  f) evaluating said position function to determine a position that corresponds to the highest probability of location, and defining that position to be the location of the mobile receiver.

2. A method according to claim 1, which includes the detection of a particular signature in the signal.

3. A method according to claim 1, wherein the list of signals includes a list of frequencies on which the signals were received.

4. A method according to claim 1, wherein the list contains a list of references, each reference being representative of respective transmitter information maintained by the calculation device.

5. A method according to claim 1, wherein the predetermined probability function is based on a propagation model for the radio waves between each transmitter and the receiver.

6. A method according to claim 5, wherein the propagation model is based on any or all of the transmitter power, transmitter antenna pattern, travel distance, bearing of the receiver from the transmitter, variable transmission characteristics of radio signal propagation, timing advance, or local topographical data.

7. A method according to claim 1, wherein the predetermined probability function is a Gaussian function with its origin at a pre-defined point from the transmitter.

8. A method according to claim 1, wherein the predetermined probability function is based on a heuristic derived from the probability of detections obtained at calibration points.

9. A method according to claim 1, wherein the predetermined probability function is proportional to the probability of the detection of the signals from a transmitter.

10. A method according to claim 1, in which the position function is a cost function which has its lowest numerical value at the position of maximum probability.

11. A method according to claim 10, wherein the cost function is proportional to minus the logarithm of the predetermined probability function.

12. A method according to claim 1, wherein the timing advance is included in the position function.

13. A method according to claim 1, wherein position function is modified to take account of the reliability of the detection of each of the signals by the receiver.

14. A method according to claim 13, in which the reliability measurement is dependent upon the difference between the received power and the detection threshold.

15. A method according to claim 14, in which the reliability measurement includes the number of times the signal has been detected.

16. A method according to claim 13, in which the reliability measurement includes the number of times the signal has been detected.

17. A method according to claim 1, in which the list sent from the receiver to the calculation device is sorted.

18. A method according to claim 17, in which the list sent from the receiver to the calculation device is sorted in terms of power received by the mobile receiver.

19. A method according claim 17, in which the list sent from the mobile receiver to the calculation device is sorted in terms of the reliability of signal reception.

20. A system comprising a mobile receiver device and a calculation device, wherein the mobile receiver device is a mobile GSM receiver device configured to detect signals from a plurality of GSM transmitters, each of the transmitters transmits signals on a respective particular frequency in a GSM network, the positions of which transmitters are known, and arranged to compile a list of visible transmitters including corresponding transmitter related information decoded from the signals received by the mobile GSM receiver; about a mobile GSM and GSM network, and to send said list, in use, to a calculation device, each of the transmitted signals received by the mobile GSM receiver having been received above a predetermined power level by the mobile GSM receiver at a particular location where the signals can include signals from non-serving transmitters and a serving transmitter, a mobile GSM and GSM network, the calculation device determines location of the mobile GSM receiver in one or more dimensions in a radio system which includes the network of GSM transmitters in which each of the transmitters transmits signals on a respective particular frequency and the positions of which transmitters are known, and the calculation device is arranged to:

a) receive, from the mobile GSM receiver, a list of the transmitters that are visible in said network to the receiver, said list including information decoded from each of said signals on a respective particular frequency from the transmitters visible in said network, and each of which respective signals have been received above a predetermined power level by the mobile GSM receiver at a particular location where the signals can include signals from non serving transmitters and a serving transmitter, said decoded information relating to the identity of each of the corresponding transmitters,    b) create a further list of transmitters which are in said network of GSM transmitters but not detected by the mobile receiver,    c) construct a position function which relates to the probability that the mobile GSM receiver is at a particular location given the transmitters in said list, which position function has components corresponding to each transmitter in the list and to each transmitter in the further list of transmitters not detected by the mobile receiver, each component including a predetermined probability function that depends on the mobile GSM receiver position, and    d) evaluate said position function to determine a position that corresponds to the highest probability of location, and defining that position to be the location of the mobile GSM receiver.

21. A system according to claim 20, wherein the calculation device is attached to the mobile receiver.

22. A system according to claim 20, wherein the calculation device is remote from, but in communication with the mobile receiver.

23. A method of determining the location of a mobile GSM receiver in one or more dimensions in a radio system which includes a network of GSM transmitters in which each of the transmitters transmits transmitting signals on a respective particular frequencies frequency and the positions of which transmitters are known, said GSM receiver configured to receive signals from said GSM transmitters, the method comprising the steps of:

a) detecting signals received by the mobile GSM receiver from the transmitters that are visible in said network, each of which visible signals are is above a predetermined power level on its respective particular frequency and which can include signals from non-serving transmitters and a serving transmitter, said detecting including decoding, from each of said received signals above said predetermined power level, information relating to the identity of the corresponding one of said transmitters in the network;

b) compiling, in the mobile receiver, a list of the visible transmitters including information relating to the identity of said corresponding transmitters;

c) sending said list to a calculation device;

d) creating in the calculation device a further list of transmitters which are in said network of GSM transmitters but not detected by the mobile receiver;

e) constructing a position function which relates to the probability that the receiver is at a given location and which has components corresponding to each transmitter in the list of visible transmitters and to each transmitter in the further list of transmitters not detected by the mobile receiver, each component including a predetermined probability function that relates to the probability that the receiver is at a particular location given the transmitters in said list and said further list; and    f) evaluating said position function to determine a position that corresponds to the highest probability of location, and defining that position to be the location of the mobile receiver, wherein said the list of signals includes a list of frequencies on which the signals were received.

\* \* \* \* \*